N. SEIBERT.
Lubricator.
No. 8,740. Reissued June 3, 1879.
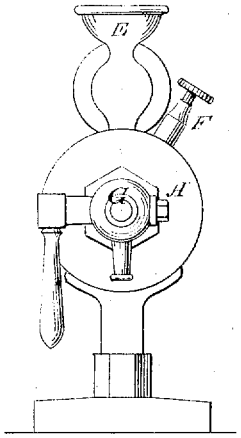
Fig. 2.
Fig. I.
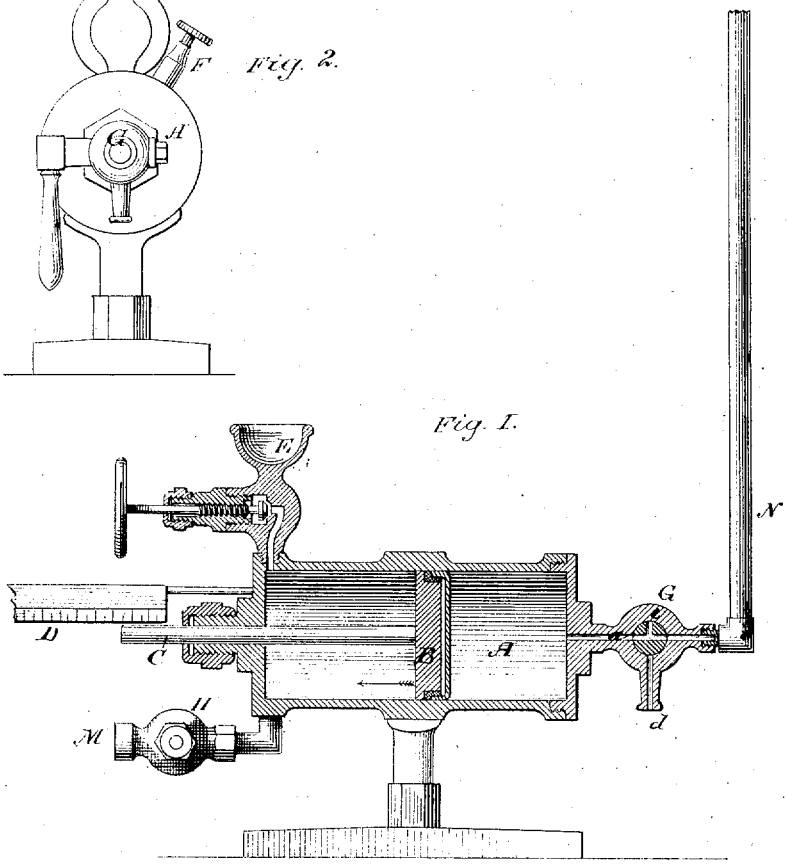
Attest:
C. Clarence Poole
S. M. Pool
Inventor:
Nicholas Seibert
per atty.
A. H. Evans Jr.

UNITED STATES PATENT OFFICE.

NICHOLAS SEIBERT, OF SAN FRANCISCO, CALIFORNIA.

IMPROVEMENT IN LUBRICATORS.

Specification forming part of Letters Patent No. 94,780, dated September 14, 1869; Reissue No. 8,740, dated June 3, 1879; application filed August 28, 1876.

*To all whom it may concern:*

Be it known that I, NICHOLAS SEIBERT, of the city and county of San Francisco, State of California, have invented a Self-Indicating Lubricator; and I do hereby declare the following description and accompanying drawings are sufficient to enable any person skilled in the art or science to which it most nearly appertains to make and use my said invention or improvement without further invention or experiment.

My invention relates to lubricators more especially adapted for use in supplying oil to steam-chests and cylinders of steam-engines, where it is always desirable to have a regular and constant feed of the lubricant.

My invention consists in a novel method of feeding the oil to the cylinders, said feed being accomplished by means of hydrostatic pressure, operating through devices substantially as herein described.

In the general mode of feeding oil to cylinders, the opening through which the oil passes to the valves or other parts is the only point where the lubricant is exposed to the effect of the steam-pressure, and the oil is subjected to constant ebullition, and an irregularity of feed is a necessary result.

If steam can be applied on each side of the body of the lubricant, so as to produce a state of equilibrium, and then some constant and regularly-augmented power be brought into operation to disturb this equilibrium in one direction, the oil will be forced in that direction, and be supplied with a regularity depending upon the regularity of the augmentation of the power used to disturb the equilibrium of the steam-pressure on the lubricant.

One of the powers I use to disturb the steam-equilibrium is a hydrostatic column formed by the condensation of steam in an extended pipe to form one of the steam-connections to create the equilibrium before mentioned.

The apparatus I use is in the form of a cylinder having a piston, and a piston-rod extends from it through one end of the cylinder. The cylinder is filled with melted tallow or other lubricant through a globe or other cock, the tallow filling all the space at one side of the piston, which is pushed back to near the extreme end of the cylinder. A cock behind the piston admits steam from a pipe that passes up and connects with the steam-pipe above the lubricant-cylinder.

Another cock connects with a siphon-pipe, through which the oil passes, leading to a point lower down on the steam-pipe or into the steam-chest.

A small scale extends from the front cylinder-head parallel with the piston-rod, and the divisions show at what rate the piston is moving, and consequently the amount of the lubricant used per hour.

Referring to the accompanying drawings for a fuller explanation of my invention, Figure 1 is a longitudinal vertical section of my apparatus. Fig. 2 is an end view.

Similar letters of reference in each of the figures indicate like parts.

A is a cylinder, within which the piston B travels. The piston-rod C extends through the front cylinder-head, being packed so as to not leak. A scale, D, extends from the front cylinder-head parallel with the line of motion of the rod C and by the speed with which the rod passes the divisions on the scale the amount of oil or tallow used per hour is estimated.

A feeding-cup, E, is placed on the top of the cylinder, and through this the cylinder is filled, the piston being pushed back near to the extreme end.

A small escape-cock, F, allows the air to pass, so that the oil will readily enter the cylinder when it is being filled.

At the back of the cylinder is a cock, G, which admits the hot or condensed steam from the pipe N, passing upward, and connected with the steam-pipe, in order to create an equilibrium of the piston and counteract the pressure through feeding-pipe M and cock H. This cock G is made with a passage, *a*, through which the steam and water passes, and a short one, *c*, extending half through the key at right angles with the passage *a*.

When it is necessary to discharge any accumulation of water from condensation of steam in cylinder A or pipe N, the cock is turned so that the passage *c* connects with the interior of the cylinder only or pipe only, when one side of the passage *a* will communicate with the escape-pipe *d*, the steam.

passage or the cylinder being thus alternately cut off. The steam, becoming condensed in the pipe N, forms a hydrostatic column behind the piston, and this column, acting in conjunction with the steam in pipe N, overcomes the pressure from pipe M, and the piston is forced slowly and regularly in the direction of the arrow, thus giving a constant and regular feed of the lubricant through the supply-pipe M, and the continued condensation of the steam regularly augmenting and supplying the hydrostatic column.

The oil or tallow is forced by the piston out through the cock H, from which it passes to its destination. The forms of cock to be used are not of especial importance, although I have made use of globe-cocks for my present illustration as being the most economical and tight.

The amount of oil used in a given time may be seen by a glance at the scale D, which also may show when the supply is exhausted, and by means of the cocks the escape of oil is so regulated as to insure a constant supply.

The apparatus is not liable to get out of repair, and the saving in the quantity of the lubricant, as well as in wear, is very great.

In applying my invention to locomotives, or wherever the lubricant is needed at more than one point, two pistons may be used in the same cylinder, and pipe N being applied between them, they are gradually forced toward the ends of the cylinder, thus supplying the lubricant through different cocks to the respective points of consumption.

I am aware that heretofore oil has been fed by means of steam-pressure transmitted through a body of water, the latter acting as an insulating medium to protect the oil from the heat.

Having thus described my invention, what I claim as new, and desire to secure by Letters Patent, is—

1. The arrangement of a cylinder, A, provided with a piston, B, and pipe N, substantially as described, whereby the lubricant is fed by means of hydrostatic pressure or steam-pressure, or both.

2. The cylinder A, pipe N, and cocks G and H, arranged substantially as described, whereby the lubricant may be fed by hydrostatic pressure.

3. The method herein described of feeding a lubricant by means of hydrostatic pressure, operating through devices substantially as herein shown and explained.

NICHOLAS SEIBERT.

Witnesses:
JNO. L. BOONE,
F. O. WEGENER.